(12) United States Patent
Asanuma (10) Patent No.: US 8,325,606 B2
(45) Date of Patent: Dec. 4, 2012

(54) WIRELESS TRANSMISSION APPARATUS, WIRELESS RECEPTION APPARATUS, AND TRANSMISSION METHOD

(75) Inventor: Yutaka Asanuma, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 646 days.

(21) Appl. No.: 12/546,325

(22) Filed: Aug. 24, 2009

(65) Prior Publication Data

US 2010/0232375 A1 Sep. 16, 2010

(30) Foreign Application Priority Data

Mar. 16, 2009 (JP) ................... 2009-063249

(51) Int. Cl.
*H04J 1/16* (2006.01)
(52) U.S. Cl. .............. 370/232; 370/233; 455/452.2; 455/450
(58) Field of Classification Search .......... 370/329, 370/229, 230, 230.1, 231, 232, 233, 234, 370/235, 330, 335, 336, 341, 342, 343, 344, 370/347, 348; 455/434, 435.2, 447, 450, 455/452.1, 452.2, 453
See application file for complete search history.

(56) References Cited

U.S. PATENT DOCUMENTS

| | | | | |
|---|---|---|---|---|
| 2008/0240275 | A1* | 10/2008 | Cai | 375/260 |
| 2010/0272035 | A1* | 10/2010 | Park et al. | 370/329 |
| 2011/0013581 | A1* | 1/2011 | Lee et al. | 370/329 |
| 2011/0142075 | A1* | 6/2011 | Che et al. | 370/476 |

FOREIGN PATENT DOCUMENTS

JP 2008-187682 A 8/2008

OTHER PUBLICATIONS

3GPP ($3^{rd}$ Generation Partnership Project) 2 C.S0002-D V2.0, p. 1-9.
3GPP TS 36.104 V8.2.0, May 2008, pp. 10-11.
3GPP TS 36.101 V8.2.0, May 2008, p. 14.
U.S. Appl. No. 12/512,199, filed Jul. 30, 2009; Wireless Base Station Apparatus and Mobile Wireless Terminal Apparatus. First named inventor Yutaka Asanuma.
U.S. Appl. No. 12/546,757, filed Aug. 25, 2009; Wireless Transmission Apparatus, Wireless Reception Apparatus, and Transmission Method. First named inventor Yutaka.
U.S. Appl. No. 12/558,763, filed Sep. 14, 2009; Wireless Transmission Apparatus, Wireless Reception Apparatus, and Wireless Communication Method.
3GPP TS 36.213 V8.3.0, Section 7, Physical Downlink Shared Channel Related Procedures, May 2008; pp. 14-17.
3GPP TS 36.211 V8.3.0, Section 6.8, Physical Downlink Control Channel, May 2008; . 54-56.
3GPP TS 36.212 V8.3.0, Section 5.3.3, Downlink Control Information, May 2008; pp. 38-39.
3GPP TS 36.306 V8.2.0, May 2008; pp. 7-8.

* cited by examiner

*Primary Examiner* — Kibrom T Hailu
*Assistant Examiner* — Dady Chery
(74) *Attorney, Agent, or Firm* — Maschoff Gilmore & Israelsen (57) ABSTRACT

A wireless base station apparatus assigns channels to a narrowband mobile wireless terminal apparatus of type x (Rel-3 LTE) within the range of one component as its standard and assigns, to a broadband mobile wireless terminal apparatus of type y (LTE-A), channels not only within the range of one component but also channels in other components or between components.

2 Claims, 6 Drawing Sheets

WIRELESS TRANSMISSION APPARATUS, WIRELESS RECEPTION APPARATUS, AND TRANSMISSION METHOD

CROSS-REFERENCE TO RELATED APPLICATIONS

This application is based upon and claims the benefit of priority from prior Japanese Patent Application No. 2009-063249, filed Mar. 16, 2009, the entire contents of which are incorporated herein by reference.

BACKGROUND OF THE INVENTION

1. Field of the Invention

The present invention relates to communication between a wireless base station apparatus and a mobile wireless terminal apparatus which are accommodated in a network.

2. Description of the Related Art

A mobile communication system such as a cellular system uses various parameters for defining the transmission/reception capability of a terminal to support terminals of various application purposes (e.g., 3GPP (3rd Generation Partnership Project) TS 36.306 V8.2.0 (2008 05)). Combinations of parameters define UE categories. Terminal capabilities (UE capabilities) that define the UE categories include a maximum information transmission rate which is defined on each of the transmitting and receiving sides. A base station transmits/receives signals to/from a plurality of terminals based on their different transmission and reception capabilities. The 3GPP (3rd Generation Partnership Project) TS 36.306 V8.2.0 (2008 05) suggests that a base station should be able to simultaneously connect terminals of different categories.

Recently, an LTE-Advanced (LTE-A) system has been examined, which uses a broadband including a system band that is the receivable bandwidth of a Rel-8 LTE terminal. To operate the Rel-8 LTE terminal using a narrowband in the new system using a broadband, the base station of the new system needs to transmit a signal that is receivable by the Rel-8 LTE terminal as well.

The Rel-8 LTE terminal starts its operation ahead of the new system. It is therefore difficult to change the reception band of the Rel-8 LTE terminal later at the start of the operation of the new system. In addition, the ratio of Rel-8 LTE terminals that exist in the radio zone of one base station to terminals ("LTE-A terminals" hereinafter) that use the broadband there dynamically changes. For this reason, the LTE system that assigns information transmission channels via control channels requires some contrivance on the control channel configuration.

The control channels are transmitted using a common resource. The Rel-8 LTE terminal and the LTE-A terminal perform blind determination and detect control information addressed to them. A downlink physical channel transmitted from the base station multiplexes a physical downlink control channel (PDCCH) and physical downlink shared channel (PDSCH) (e.g., 3GPP TS 36.211 V8.3.0 [2008-05] 6.8, Physical downlink control channel, 3GPP TS 36.212 V8.3.0 [2008-05] 5.3.3, Downlink control information, and 3GPP TS 36.213 V8.3.0 [2008-05] 7, Physical downlink shared channel related procedures).

A terminal receives the PDCCHs and detects the assignment information of information transmission channels PDSCH of the terminal based on the PDCCHs for the terminal. The terminal then receives the PDSCHs based on the PDSCH assignment information. The PDCCHs are scrambled in different ways for the respective terminals. Each terminal decodes the PDCCHs using a unique decoding method and determines a correctly detected PDCCH as the PDCCH for the terminal. This processing is called blind determination.

As the control channel transmission method, control information for a Rel-8 LTE terminal and that for a broadband terminal may be transmitted using different resources. However, this resource use method cannot be efficient because the terminal existence ratio dynamically changes, as described above.

For this reason, there is a demand for development of a system which allows a Rel-8 LTE terminal (broadband reception apparatus) to receive PDCCHs without changing its specifications and an LTE-A terminal (narrowband reception apparatus) to efficiently receive PDCCHs.

BRIEF SUMMARY OF THE INVENTION

The present invention has been made to meet the above requirement, and has as its object to provide a wireless transmission apparatus, a wireless reception apparatus, and a transmission method, which allow a narrowband reception apparatus to receive information without changing its specifications and a broadband reception apparatus to efficiently receive information when transmitting channel assignment information to the narrowband reception apparatus and the broadband reception apparatus using a common resource.

To achieve the object, an aspect of the present invention is a wireless transmission apparatus which notifies a wireless reception apparatus of channel assignment via channel assignment information using a first scheme of performing wireless transmission using channels within a range of a first bandwidth and a second scheme of performing wireless transmission using channels within a range of a second bandwidth including the first bandwidth, and transmits data. The wireless transmission apparatus comprises a first transmission unit which transmits, via the channels within the range of the first bandwidth, a plurality of items of first channel assignment information to be sent to a plurality of wireless reception apparatuses using the first scheme, respectively, and part of a plurality of items of second channel assignment information to be sent to a plurality of wireless reception apparatuses using the second scheme, respectively; and a second transmission unit which transmits a remainder of the second channel assignment information via channels in bands adjacent to the first bandwidth.

As described above, in the present invention, channel assignment information of the first scheme using a narrowband and part of channel assignment information of the second scheme using a broadband are transmitted via the channels in the range of the first bandwidth. On the other hand, the remainder of the channel assignment information of the second scheme using a broadband is transmitted via the channels in the bands adjacent to the first bandwidth.

According to the present invention, it is therefore possible to provide a wireless transmission apparatus, a wireless reception apparatus, and a transmission method, which allow the narrowband reception apparatus of the first scheme to receive the information without changing its specifications and the broadband reception apparatus of the second scheme to efficiently receive the information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawing.

A wireless communication system according to the present invention will be described by exemplifying a cellular system using OFDM in the downlink. This wireless communication system includes mobile wireless terminals and a wireless base station and performs wireless communication using OFDM in the downlink transmitted from the wireless base station and received by the mobile wireless terminals. There are two types of mobile wireless terminals, i.e., a type x conforming to Rel-8 LTE and a type y conforming to LTE-Advanced (LTE-A). The wireless base station transmits signals to a plurality of mobile wireless terminals of type x and a plurality of mobile wireless terminals of type y.

The maximum receivable bandwidth of the mobile wireless terminal of type x is one component (18.015 MHz). The maximum receivable bandwidth of the mobile wireless terminal of type y includes one component (18.015 MHz) and the bands between this component and other components adjacent to it. The wireless base station transmits signals receivable by the mobile wireless terminals of both types.

A description will be made below assuming that the mobile wireless terminal of type y can receive all bands between the components, for the sake of simplicity. In an actual system, however, the mobile wireless terminal of type y may receive only part of the bands between the components. Alternatively, the mobile wireless terminal of type y may receive, e.g., three components and the bands between them.

Figure 1:
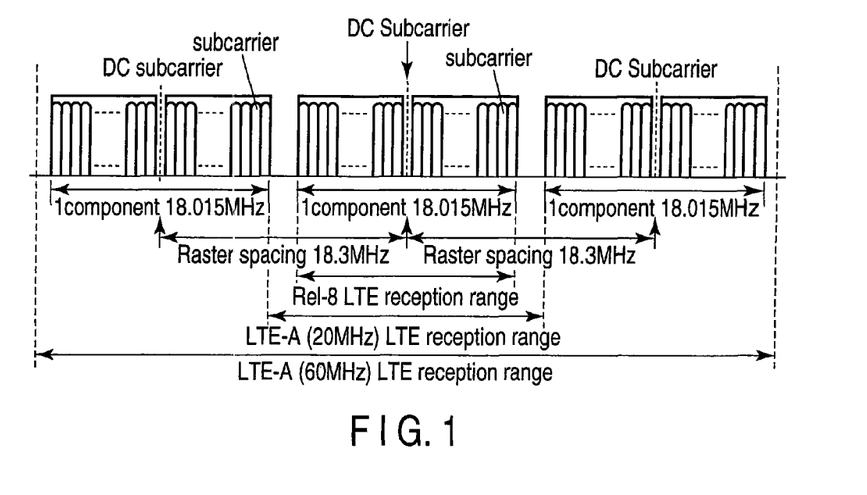
FIG. 1 is a view for explaining communication bands used in a wireless communication system according to the present invention.
Figure 2:
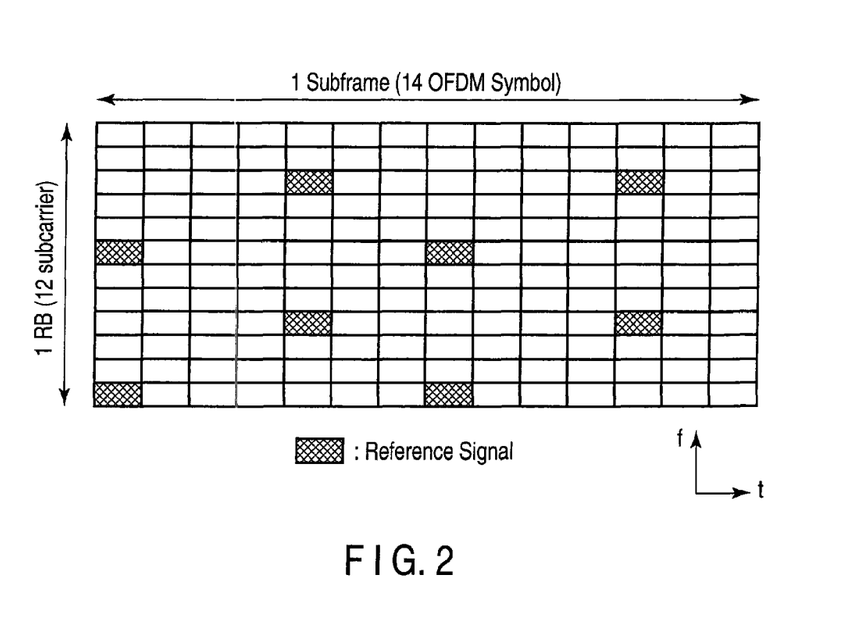
FIG. 2 is a view for explaining a resource block assigned to subcarriers shown in FIG. 1.

As shown in FIG. 1, the wireless base station arranges a DC subcarrier at the center frequency of one component, thereby forming a transmission signal band of 18.015 MHz (number of subcarriers=1201). That is, the subcarrier spacing is 15 kHz. Note that the wireless base station transmits no signal on the DC subcarrier. In addition, the wireless base station forms one resource block (RB) by a 180-kHz bandwidth containing 12 subcarriers, as shown in FIG. 2. Hence, one component includes 100 RBs.

Note that an RB includes 14 symbols in the time direction. Reference signals which are known signals as the reference of a received signal are inserted.

The wireless base station transmits, on each band (18.015 MHz) between the components, subcarriers receivable by only the mobile wireless terminal of type y. FIG. 1 does not illustrate these subcarriers. The system description may regard the transmission signal bandwidth as 18 MHz and the guard bandwidth as 2 MHz (1 MHz on each side) excluding the DC subcarrier.

Figure 3:
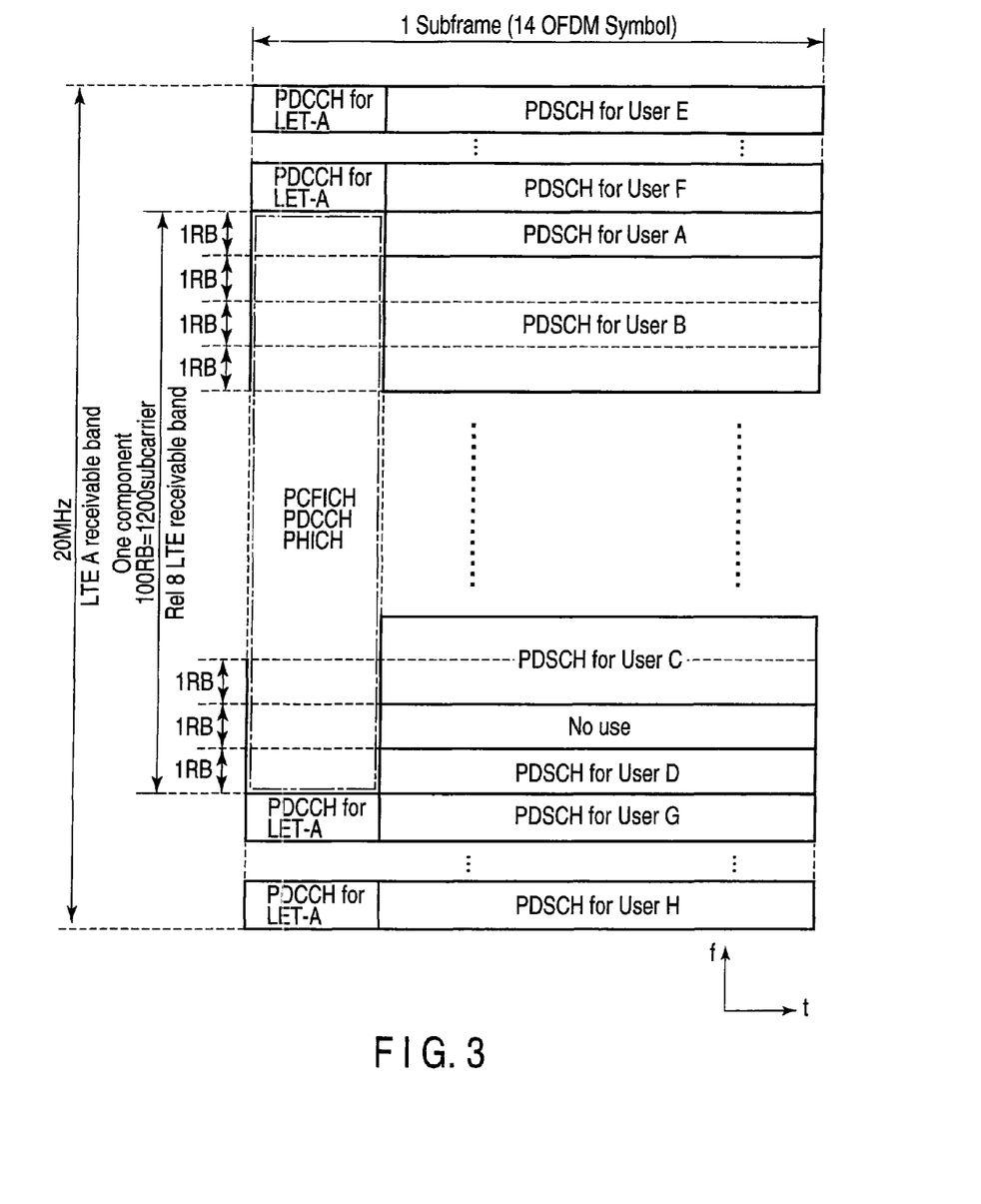
FIG. 3 is a view for explaining channels assigned to the resource block shown in FIG. 2.

FIG. 3 shows the structure of a transmission signal of one subframe the wireless base station transmits to the mobile wireless terminals of types x and y. In FIG. 3, the RBs are arranged in the frequency direction. The signal transmitted from the wireless base station to the mobile wireless terminals of types x and y includes control channels (PCFICH, PDCCH, and PHICH) to transmit control information and data channels (PDSCH) to transmit transmission information. These channels are time-divisionally distributed and transmitted.

As described above, the mobile wireless terminal of type x can receive one component. One or more RBs in the component are assigned via PDCCHs which are sent from the wireless base station for PDSCH reception. That is, referring to FIG. 3, the mobile wireless terminal of type x corresponds to one of Users A, B, C, and D.

On the other hand, the mobile wireless terminal of type y can receive one component and the bands between this component and other components adjacent to it. That is, the mobile wireless terminal of type y can receive the subcarriers arranged between these components as well. The wireless base station assigns one or more RBs in the receivable bands for PDSCH reception. That is, referring to FIG. 3, the mobile wireless terminal of type y can be any one of Users A, B, C, D, E, F, G, and H.

Each of the mobile wireless terminals of types x and y receives the PDCCHs for it. Based on the information, each mobile wireless terminal specifies the RBs to which the PDSCHs for the terminal are assigned and receives only the specified RBs (PDSCHs) for the terminal. More specifically, the wireless base station makes PDCCHs include assignment information representing which PDSCH is assigned to which mobile wireless terminal.

The wireless base station multiplexes and arranges the PDCCHs for the respective mobile wireless terminals throughout the signal band. The arrangement positions are not fixed for the respective mobile wireless terminals. For this reason, each mobile wireless terminal needs to search for (blind-detect) PDCCHs addressed to it from the multiplexed PDCCHs.

The mobile wireless terminal of type x can use only one component. Hence, the wireless base station arranges PDCCHs and PDSCHs for each mobile wireless terminal of type x in a single component so that the mobile wireless terminal of type x need only perform blind detection in one component. On the other hand, the mobile wireless terminal of type y can use a broadband including one component and the subcarriers between this component and other components adjacent to it, as shown in FIG. 3. For this reason, the wireless base station can distribute PDCCHs on a wider band as compared to the mobile wireless terminal of type x.

An LTE-A system is implemented by expanding the standard of a Rel-8 LTE system. Conversely, the mobile wireless terminal of type x has no function of receiving the band and PDCCH structure expanded to the LTE-A standard. Even when the LTE-A system is introduced, the PDCCH structure receivable by the mobile wireless terminal of type x does not change from that in the Rel-8 LTE system. Hence, expansion to the LTE-A standard needs to be done not to cause any problems for reception by the mobile wireless terminal of type x.

The ratio of resources used for communication by the mobile wireless terminals of type x and the mobile wireless terminals of type y varies over time. For this reason, the wireless base station cannot determine in advance allocation of the resource to map the PDCCHs. The mobile wireless terminals of type x and the mobile wireless terminals of type y need to share the PDCCH resource. For this reason, each of the mobile wireless terminals of types x and y performs blind determination, i.e., receives a number of PDCCHs and searches for PDCCHs with coincident CRCs, thereby detecting the PDCCHs addressed to the terminal.

Each mobile wireless terminal can detect only PDCCHs addressed to it. Hence, each mobile wireless terminal of type x cannot know the total size of PDCCHs, i.e., the resource allocation of PDCCHs transmitter in the LTE-A standard. Similarly, each mobile wireless terminal of type y cannot know the total size of PDCCHs, i.e., the resource allocation of PDCCHs transmitted in the Rel-8 LTE standard. For these reasons, the mobile wireless terminals of type x and the mobile wireless terminals of type y preferably execute the same reception processing independently of the PDCCH resource allocation.

Figure 4:
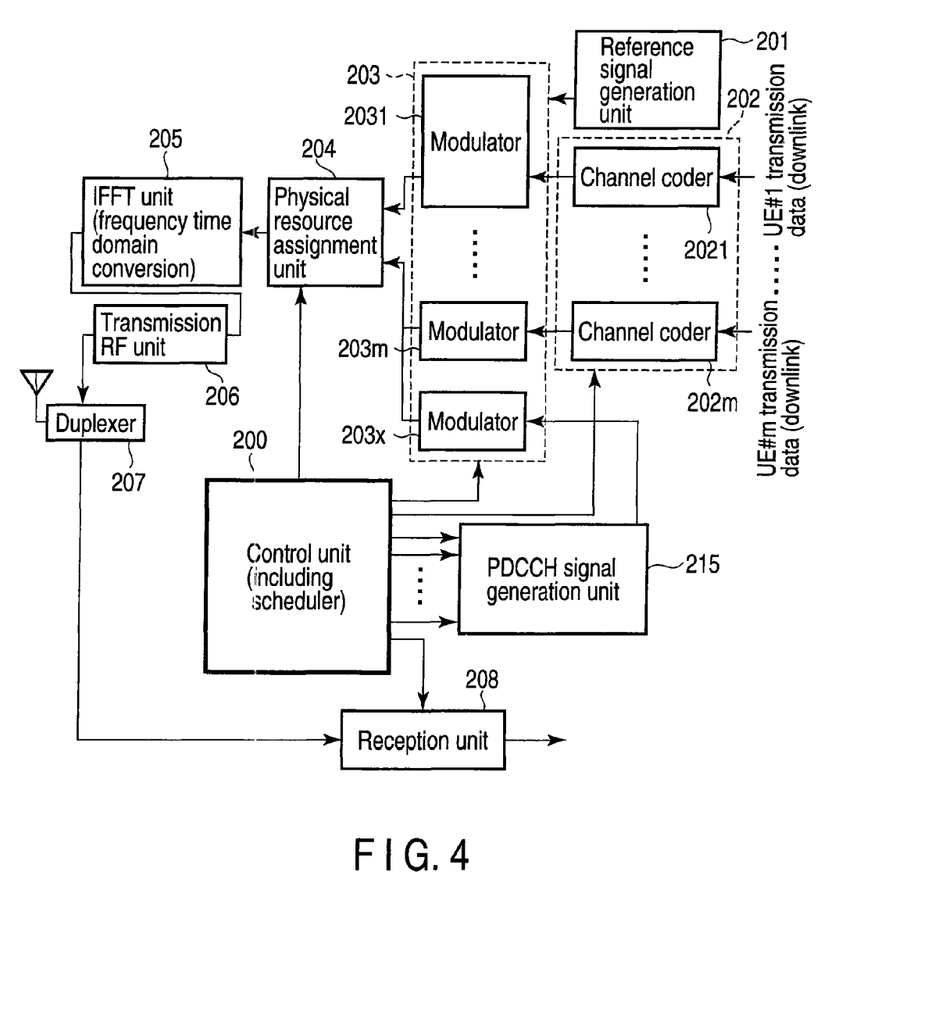
FIG. 4 is a block diagram showing the arrangement of a wireless base station in a wireless communication system according to an embodiment of the present invention.

The arrangement of the wireless base station will be explained. FIG. 4 shows the arrangement.

A reference signal generation unit 201 generates a bitstream that is the base of a reference signal. The bitstream is scrambled and then output to a modulation unit 203. A channel coding unit 202 includes channel coders 2021 to 202$m$.

The channel coders 2021 to 202$m$ channel-code transmission information (downlink transmission data bitstreams) to be transmitted via data channels or assignment information supplied from a control unit 200 at a channel coding rate designated by the control unit 200. The channel coders 2021 to 202$m$ output the downlink transmission data signals thus obtained to the modulation unit 203. Note that the downlink transmission data bitstreams include data addressed to the mobile wireless terminals of type x and data addressed to the mobile wireless terminals of type y.

A PDCCH signal generation unit 215 receives PDCCH data generated by the control unit 200 and addressed to a mobile wireless terminal of type x or a mobile wireless terminal of type y. That is, the PDCCH signal generation unit 215 receives PDCCH data addressed to a terminal of the LTE-A system or a terminal of the Rel-8 LTE system. The PDCCH data include identification information of PDSCHs assigned to a terminal. The PDCCH signal generation unit 215 executes processing such as channel coding, multiplexing, and interleaving for the PDCCH data, thereby obtaining PDCCH signals.

The modulation unit 203 includes modulators 2031 to 203$m$ corresponding to the channel coders 2021 to 202$m$, respectively, and a modulator 203$x$ corresponding to the PDCCH signal generation unit 215. In accordance with a modulation method designated by the control unit 200, the modulators 2031 to 203$m$ and 203$x$ perform digital modulation such as quadrature phase-shift keying (QPSK) for the reference signals, the downlink transmission data signals, and the PDCCH signals.

A physical resource assignment unit 204 receives the signals digitally modulated by the modulators 2031 to 203$m$ and 203$x$ and PCFICH signals and PHICH signals generated by the control unit 200. The physical resource assignment unit 204 assigns these signals to the subcarriers (resource blocks) of predetermined channels (control channels and data channels) designated by the control unit 200. Note that "assigning a signal to a subcarrier" indicates "adding, to a signal expressed by a complex value, a subcarrier index representing the position on the time and frequency axes of a subcarrier in a corresponding resource block.

The channel band transmitted from the wireless base station is divided into the above-described RBs. Subcarriers arranged in each channel band are put together into one RB. This can uniquely be obtained based on channel band information and the number of resource blocks sent from the wireless base station to each mobile wireless terminal in advance. The mobile wireless terminal also recognizes the RB structure. In the wireless base station, this is implemented by the control unit 200 and the physical resource assignment unit 204.

An inverse fast Fourier transformation (IFFT) unit 205 converts a frequency-domain signal output from the physical resource assignment unit 204 into a time-domain signal. A transmission RF unit 206 including a digital-to-analog converter, an upconverter, and a power amplifier converts the signal into a radio-frequency (RF) signal. This radio signal is emitted into space, via a duplexer 207 and an antenna, for reception by the mobile wireless terminals.

A reception unit 208 receives, via the antenna and the duplexer 207, a radio signal transmitted from each mobile wireless terminal.

The control unit 200 comprehensively controls the units of the wireless base station. The control unit 200 includes a scheduler which decides, for each frame, which channel band should be assigned to which mobile wireless terminal and the packet to be used for transmission, based on, e.g., the type (x or y) of the standard (Rel-8 LTE or LTE-A) supported by each mobile wireless terminal, the amount of data for each mobile wireless terminal, and the priority and capabilities (UE capabilities) of each mobile wireless terminal.

The scheduler assigns resource blocks within the range of one component to a mobile wireless terminal of type x. On the other hand, the scheduler assigns resource blocks within the range of a broadband including three components at maximum to a mobile wireless terminal of type y.

Figure 5:
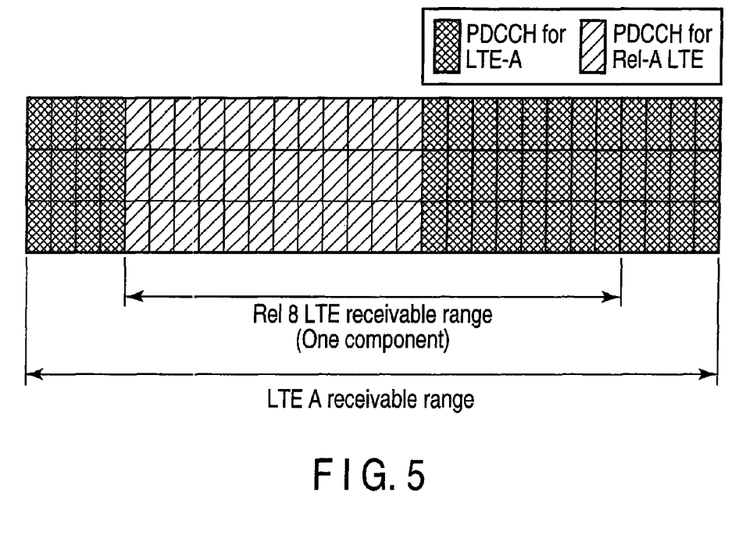
FIG. 5 is a view for explaining channel assignment to mobile wireless terminals.

FIG. 5 illustrates the PDCCH assignment ranges of the mobile wireless terminal of type x and the mobile wireless terminal of type y. More specifically, resource blocks are assigned to the mobile wireless terminal of type x within the range of one component. On the other hand, resource blocks are assigned to the mobile wireless terminal of type y within the range of a 20-MHz band which includes the range of the one component.

Note that the assignment of resource blocks within the range of one component to the mobile wireless terminal of type y need not always be done in the form shown in FIG. 5. However, the resource blocks preferably continue to those outside the component range in terms of frequency, as shown in FIG. 5. The resource block assignment processing will be described later in detail.

The capabilities (UE capabilities) of a mobile wireless terminal and the type of the standard supported by it are detected by the control unit 200 from data received from the mobile wireless terminal. Additionally, in accordance with information representing the channel band assigned to each mobile wireless terminal, the control unit 200 generates PCFICH, PDCCH, and PHICH including the information for the mobile wireless terminal and outputs the items of information to the PDCCH signal generation unit 215 and the physical resource assignment unit 204.

Figure 6:
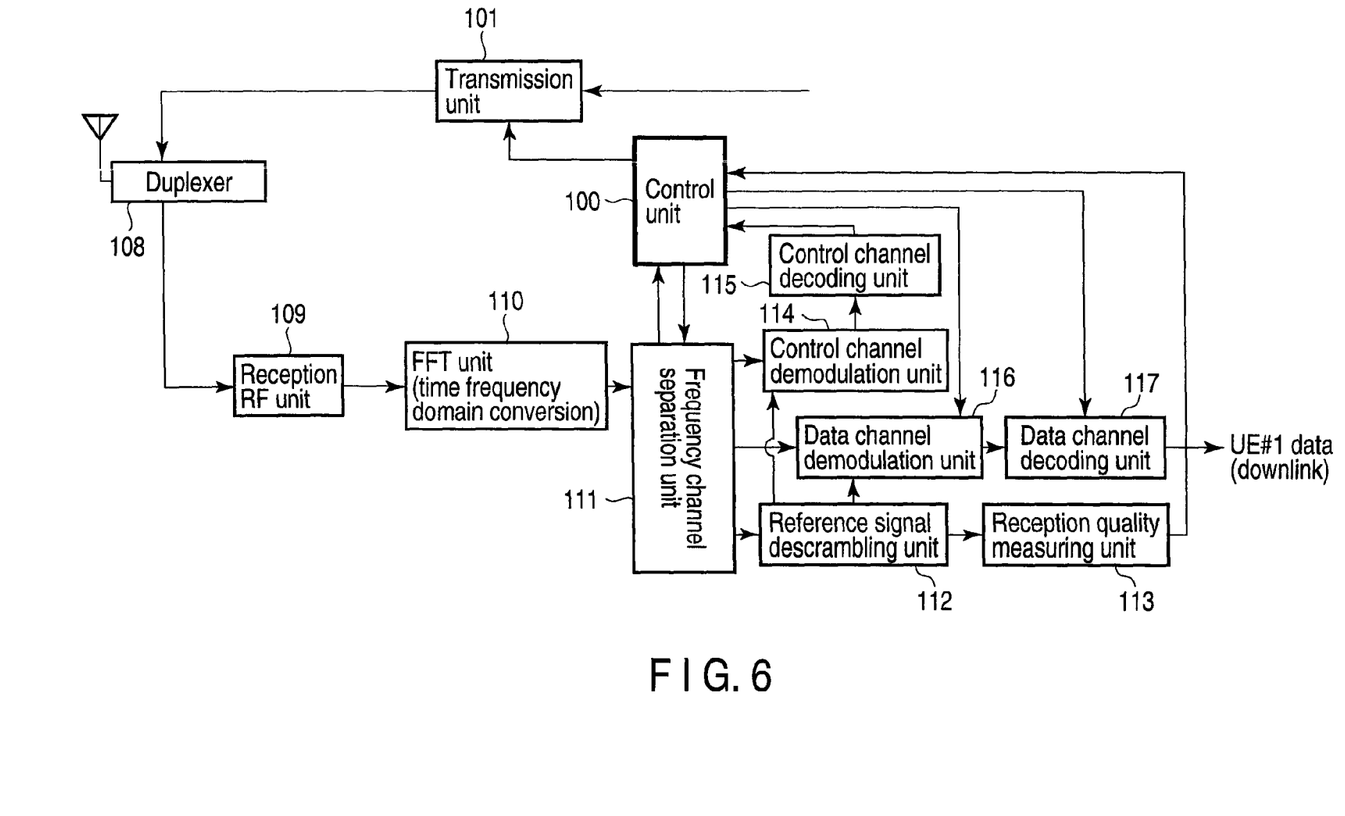
FIG. 6 is a block diagram showing the arrangement of a mobile wireless terminal in the wireless communication system according to the embodiment of the present invention.

The arrangement of each mobile wireless terminal will be described. FIG. 6 shows the arrangement. As described above, the mobile wireless terminal of type x and the motile wireless terminal of type y apparently have the same arrangement except for the number of components, the band to be used for reception, and the arrangement (processing) associated with reception. Hence, both terminals will be explained using FIG. 6.

A transmission unit 101 generates a radio signal for the wireless base station and emits the signal into the space via a duplexer 108 and an antenna.

The antenna receives a radio signal transmitted from the wireless base station and outputs it to a reception RF unit 109 via the duplexer 108. The reception RF unit 109 including a downconverter and an analog-to-digital converter converts the received radio signal into a baseband digital signal.

A fast Fourier transformation (FFT) unit 110 performs fast Fourier transformation of the baseband digital signal, thereby converting the time-domain signal into a frequency-domain signal, i.e., dividing the signal into subcarrier signals. The divided subcarrier signals are output to a frequency channel separation unit 111. Note that the wireless base station puts a predetermined number (e.g., 12) of subcarriers together into a resource block. The wireless base station assigns the subcarriers to a mobile wireless terminal for each resource block.

As for a channel band and resource blocks designated by a control unit 100, the frequency channel separation unit 111 separates the subcarrier signals included in the resource blocks into reference signals, control channel signals, and data channel signals.

Note that in the mobile wireless terminal of type x, the process target of the frequency channel separation unit 111 is only the range of one component designated by the control unit 100. In the mobile wireless terminal of type y, the process target of the frequency channel separation unit 111 is a broadband designated by the control unit 100 and including three components at maximum.

Regarding how to divide a channel band into resource blocks, i.e., the correspondence between subcarriers and resource blocks, the wireless base station sends channel band information and the number of resource blocks to each mobile wireless terminal in advance. The correspondence between subcarriers and resource blocks is then obtained uniquely based on the channel band information and the number of resource blocks. That is, each mobile wireless terminal detects in advance how the wireless base station divides a channel band into resource blocks, and receives signals accordingly.

A reference signal descrambling unit 112 descrambles, out of the signals, the reference signal using a descrambling pattern opposite to the scrambling pattern used by the wireless base station which transmits the signal to be received by the mobile wireless terminal. The descrambling result is output to the control channel demodulation unit 114, a data channel demodulation unit 116, and a reception quality measuring unit 113. The reception quality measuring unit 113 measures the reception quality of Ncqi resource blocks based on the reference signal. The measurement result is output to the control unit 100.

The control channel demodulation unit 114 performs channel equalization of the control channel signals output from the frequency channel separation unit 111 using the reference signal descrambled by the reference signal descrambling unit 112 and then demodulates them. The demodulation result is output to a control channel decoding unit 115 together with mapping information representing the components on which the control channels have been mapped.

The control channel decoding unit 115 detects the PCFICH and the PHICH for the terminal from the demodulated control channel signals. The control channel decoding unit 115 also executes processing such as deinterleaving, separation processing, error correction decoding, and channel decoding for the demodulated control channel signals, thereby blind-detecting the PDCCHs for the terminal. The bitstreams of the control channels (PCFICH, PHICH, and PDCCH) obtained in this way are output to the control unit 100.

The control unit 100 comprehensively controls the units of the mobile wireless terminal. The control unit 100 controls the units (e.g., frequency channel separation unit 111) of the reception system to detect, based on the PDCCH information acquired from the control channels, the data channels (channel band and resource blocks) assigned to the mobile wireless terminal and receive data from the wireless base station via the data channels. Upon determining that the received signal is addressed to the mobile wireless terminal, the control unit 100 extracts signaling information contained in the signal and detects, from it, information necessary for demodulating data channel signals and information necessary for decoding them.

The information necessary for demodulating the data channel signals is output to the data channel demodulation unit 116. The information necessary for decoding the data channel signals is output to a data channel decoding unit 117. Upon determining that the received signal is not addressed to the mobile wireless terminal, the control unit 100 stops the processing of demodulating and decoding the data channel signals.

The control unit 100 detects the PDSCHs assigned to the terminal based on the PDCCHs. The control unit 100 controls the data channel demodulation unit 116 and the data channel decoding unit 117 to receive the detected PDSCHs. More specifically, in the mobile wireless terminal of type x, the control unit 100 instructs the data channel demodulation unit 116 and the data channel decoding unit 117 to receive PDSCHs for the terminal which fit within the range of one component. On the other hand, in the mobile wireless terminal of type y, the control unit 100 instructs the data channel demodulation unit 116 and the data channel decoding unit 117 to receive PDSCHs for the terminal which fit within the range of a broadband including three components at maximum.

The data channel demodulation unit 116 performs channel equalization of the signals output from the frequency channel separation unit 111 using the reference signal output from the reference signal descrambling unit 112. The data channel demodulation unit 116 then demodulates the PDSCHs designated by the control unit 100 based on a demodulation method designated by the control unit 100 and information output from it.

The data channel decoding unit 117 decodes the demodulated data bitstreams to obtain a downlink data bitstream for the mobile wireless terminal. Decoding here uses the information output from the control unit 100. Before data reception from the wireless base station, the type (x or y) and capabilities (UE capabilities) of the mobile wireless terminal are transmitted to the wireless base station via the uplink.

Figure 7:
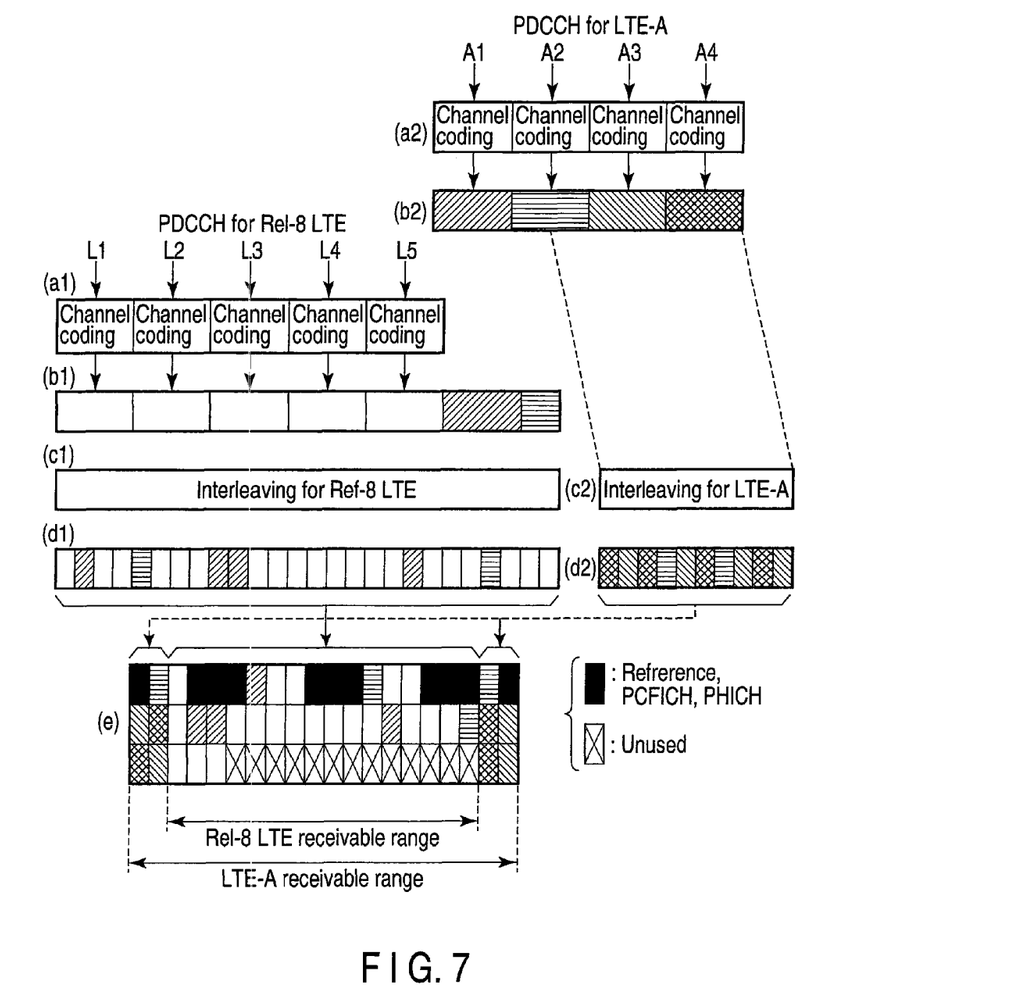
FIG. 7 is a view for explaining channel assignment to the mobile wireless terminals.

Processing of generating PDCCH signals to be transmitted via a radio signal (downlink) from the wireless base station to the mobile wireless terminals will be described next. This generation processing is executed by the PDCCH signal generation unit 215. This will be explained below in detail with reference to FIG. 7. FIG. 7 illustrates only five PDCCH data L1 to L5 for five mobile wireless terminals of type x and four PDCCH data A1 to A4 for four mobile wireless terminals of type y for the convenience of drawing size. In fact, there are more PDCCH data corresponding to a larger number of mobile wireless terminals.

First, the PDCCH signal generation unit 215 executes channel coding processing such as error correction coding, CRC bit addition, and scrambling for the PDCCH data L1 to L5 for the mobile wireless terminals of type x (a1 in FIG. 7). With this processing, coded data are generated in accordance with the sizes and coding rates of the PDCCH data L1 to L5 (b1 in FIG. 7).

Similarly, the PDCCH signal generation unit 215 executes channel coding processing such as error correction coding, CRC bit addition, and scrambling for the PDCCH data A1 to A4 for the mobile wireless terminals of type y (a2 in FIG. 7). With this processing, coded data are generated in accordance with the sizes and coding rates of the PDCCH data A1 to A4 (b2 in FIG. 7). Part of these coded data is multiplexed on the coded data (b1 in FIG. 7) for the mobile wireless terminals of type x so that they are assigned in one component.

Next, the PDCCH signal generation unit 215 interleaves the multiplexed data containing the coded data based on the PDCCH data L1 to L5 and the coded data based on the part of the PDCCH data A1 to A4 in accordance with a pattern predetermined for the full size of PDCCHs in one component (c1 in FIG. 7), thereby obtaining interleaved data (d1 in FIG. 7).

On the other hand, the PDCCH signal generation unit 215 interleaves the coded data based on the remainder of the PDCCH data A1 to A4 in accordance with a pattern predetermined for a size corresponding to bands between components (c2 in FIG. 7), thereby obtaining interleaved data (d2 in FIG. 7).

Figure 8:
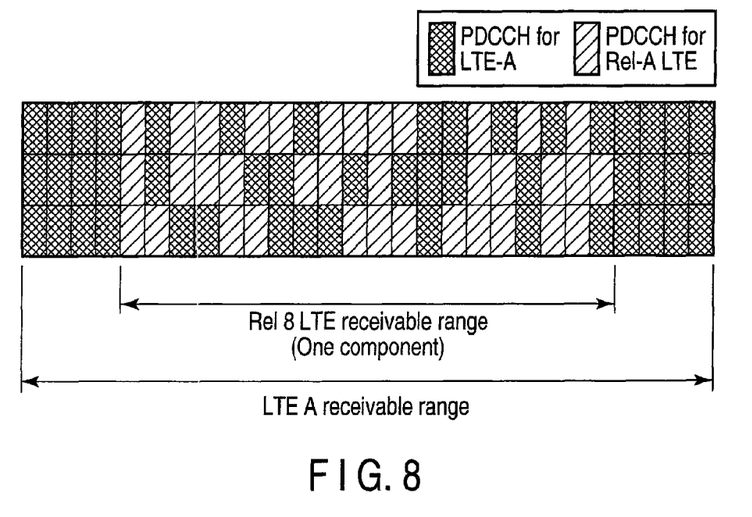
FIG. 8 is a view for explaining channel assignment to the mobile wireless terminals.

Upon this interleaving, out of the PDCCH data multiplexed as shown in FIG. 5, the data within the range of the component are mapped as shown in FIG. 8. The above-described interleaving yields the diversity effect of the PDCCH data L1 to L5 and the PDCCH data A1 to A4.

The PDCCH signal generation unit 215 outputs the data (d1 and d2 in FIG. 7) generated by the above-described processing to the modulator 203x as PDCCH signals.

The modulator 203x performs digital modulation such as quadrature phase-shift keying (QPSK) for the PDCCH signals in accordance with a modulation method designated by the control unit 200.

The scheduler decides channels (PDCCH and PDSCH) to be assigned to the mobile wireless terminals of type x and outputs the identification information of these channels to the physical resource assignment unit 204. The channels PDCCH and PDSCH to be assigned to the mobile wireless terminals of type x are limited within the range of the receivable band (one component) of Rel-8 LTE as shown in FIG. 3.

In accordance with the decision of the scheduler, the physical resource assignment unit 204 assigns the PDCCH signals of the data (d1 in FIG. 7) to the PDCCHs of the identification information sent from the scheduler (e in FIG. 7). With this processing, the five PDCCH data L1 to L5 for the five mobile wireless terminals of type x and part of the four PDCCH data A1 to A4 for the four mobile wireless terminals of type y are assigned to control channels within the range of one component.

Similarly, the scheduler decides channels (PDCCH and PDSCH) to be assigned to the mobile wireless terminals of type y and outputs the identification information of these channels to the physical resource assignment unit 204. The channels PDCCH and PDSCH to be assigned to the mobile wireless terminals of type y can be assigned not only within the range of the receivable band (one component) of Rel-8 LTE as shown in FIG. 3 but also to the bands between the components. Hence, the scheduler assigns the PDCCH signals (d2 in FIG. 7) other than those already assigned within the range of one component to the resource blocks in the bands on both sides of the one component.

In accordance with the decision of the scheduler, the physical resource assignment unit 204 assigns the PDCCH signals of the data (d2 in FIG. 7) to the PDCCHs of the identification information sent from the scheduler (e in FIG. 7). With this processing, out of the four PDCCH data A1 to A4 for the four mobile wireless terminals of type y, remaining data that are not assigned within the range of the receivable band (one component) of Rel-8 LTE are assigned to control channels in the bands on both sides of the one component.

The PDCCH signals thus transmitted to the five mobile wireless terminals of type x and the four mobile wireless terminals of type y include the identification information of the PDSCHs to be assigned to the mobile wireless terminals. The control unit 200 controls the units of the transmission system to transmit the data to the mobile wireless terminals via the PDSCHs. This processing is executed for each frame. Each mobile wireless terminal can recognize the PDSCHs assigned to it by receiving the PDCCHs.

Each mobile wireless terminal of type x performs processing in accordance with a procedure opposite to that shown in FIG. 7. More specifically, the control channel demodulation unit 114 demodulates the signals of one component. The control channel decoding unit 115 detects PCFICHs and PHICHs for the terminal from the control channel signals demodulated by the control channel demodulation unit 114.

The control channel decoding unit 115 also performs deinterleaving corresponding to c1 in FIG. 7 for the PDCCH signals contained in the demodulated control channels and executes descrambling and error correction decoding using CRC bits for each data candidate corresponding to PDCCH data, thereby blind-detecting the PDCCH data for the terminal.

Similarly, each mobile wireless terminal of type y performs processing in accordance with a procedure opposite to that shown in FIG. 7. More specifically, the control channel demodulation unit 114 demodulates the signals of one component and the signals of the bands adjacent to the component. The control channel decoding unit 115 detects PCFICHs and PHICHs for the terminal from the control channel signals demodulated by the control channel demodulation unit 114.

The control channel decoding unit 115 also performs deinterleaving corresponding to c1 or c2 in FIG. 7 for the PDCCH signals contained in the demodulated control channels in accordance with the reception band. The control channel decoding unit 115 then separates the data for the mobile wireless terminal of type y from the data obtained by deinterleaving corresponding to c1 in FIG. 7 and multiplexes the separated data on the data obtained by deinterleaving corresponding to c2 in FIG. 7.

After that, the control channel decoding unit 115 executes descrambling and error correction decoding using CRC bits for each data candidate corresponding to PDCCH data of the multiplexed data, thereby blind-detecting the PDCCH data for the terminal.

As described above, in the wireless communication system having the above arrangement, for example, channels are assigned to a mobile wireless terminal of type x (Rel-8 LTE)

within the range of one component as its standard, as shown in FIG. 5. On the other hand, a mobile wireless terminal of type y (LTE-A) is assigned channels not only within the range of one component but also channels in other components or between components.

Hence, according to the wireless communication system with the above arrangement, it is possible to assign a plurality of channels over a plurality of components to the mobile wireless terminals of type y without changing the assignment sequence for the mobile wireless terminals of type x. More specifically, when transmitting channel assignment information to a narrowband reception apparatus (mobile wireless terminal of type x) and a broadband reception apparatus (mobile wireless terminal of type y) using a common resource, the narrowband reception apparatus can receive the information without changing its specifications, whereas the broadband reception apparatus can efficiently receive the information.

Such channel assignment is executed for each frame. This makes it possible to flexibly cope with a time-rate variation in the existence ratio of the mobile wireless terminals of type x to the mobile wireless terminals of type y (LTE-A) and allows the control unit 200 to decide appropriate allocation at each point of time.

Note that the present invention is not exactly limited to the above embodiments, and constituent elements can be modified in the stage of practice without departing from the spirit and scope of the invention. Various inventions can be formed by properly combining a plurality of constituent elements disclosed in the above embodiments. For example, several constituent elements may be omitted from all the constituent elements described in the embodiments. In addition, constituent elements throughout different embodiments may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless transmission apparatus which notifies a wireless reception apparatus of channel assignment via channel assignment information using a first scheme of performing wireless transmission using channels within a range of a first bandwidth and a second scheme of performing wireless transmission using channels within a range of a second bandwidth including the first bandwidth, and transmits data, comprising:

a first transmission unit configured to transmit, via the channels within the range of the first bandwidth, a plurality of items of first channel assignment information to be sent to a plurality of wireless reception apparatuses that employ the first scheme and support the first bandwidth as a maximum receivable bandwidth and part of a plurality of items of second channel assignment information to be sent to a plurality of wireless reception apparatuses that employ the second scheme and support the second bandwidth as a maximum receivable bandwidth; and a second transmission unit configured to transmit a remainder of the second channel assignment information via channels in bands that are within the second bandwidth and adjacent to the first bandwidth.

2. A transmission method of notifying a wireless reception apparatus of channel assignment via channel assignment information using a first scheme of performing wireless transmission using channels within a range of a first bandwidth and a second scheme of performing wireless transmission using channels within a range of a second bandwidth including the first bandwidth, and transmitting data, comprising steps of:

transmitting, via the channels within the range of the first bandwidth, a plurality of items of first channel assignment information to be sent to a plurality of wireless reception apparatuses that employ the first scheme and support the first bandwidth as a maximum receivable bandwidth and part of a plurality of items of second channel assignment information to be sent to a plurality of wireless reception apparatuses that employ the second scheme and support the second bandwidth as a maximum receivable bandwidth; and transmitting a remainder of the second channel assignment information via channels in bands that are within the second bandwidth and adjacent to the first bandwidth.

* * * * *